(No Model.) 4 Sheets—Sheet 1.
J. F. CRUDGINTON.
HAND PIPE AND BOLT THREADING MACHINE.
No. 596,983. Patented Jan. 11, 1898.
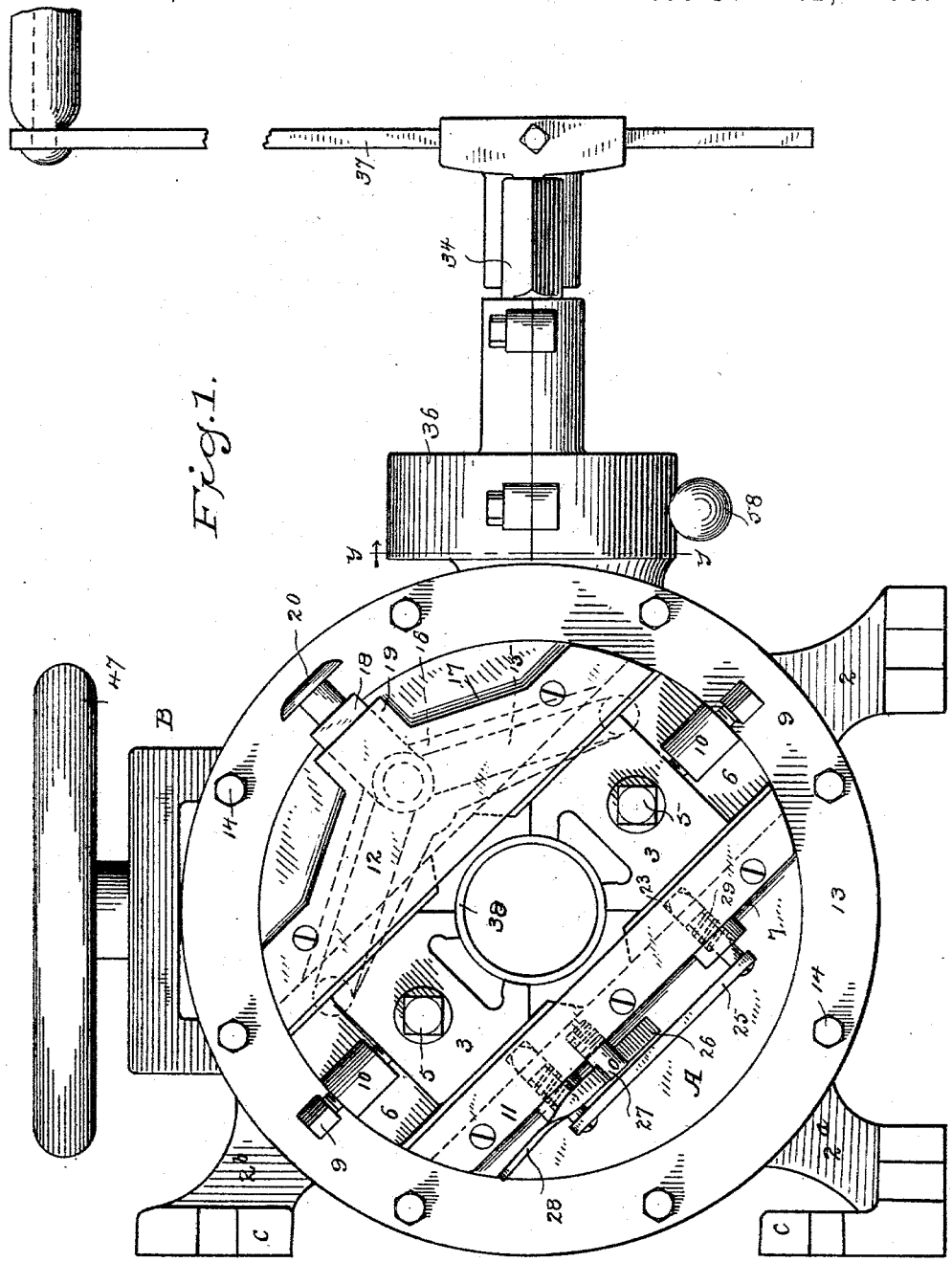
WITNESSES
H. H. Lamb
Susan V. Kiley
INVENTOR
James F. Crudginton
By
H. M. Wooster
Atty.

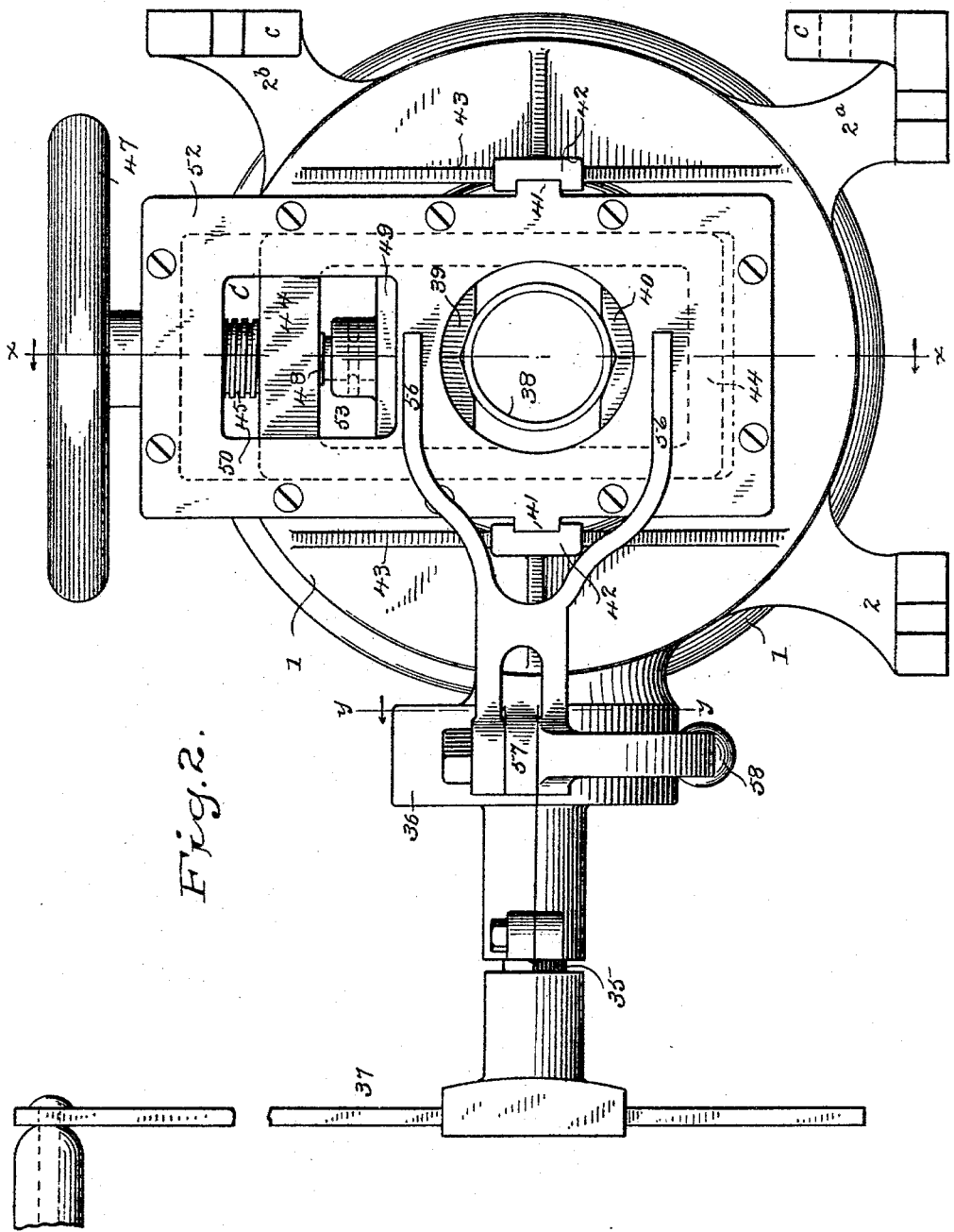

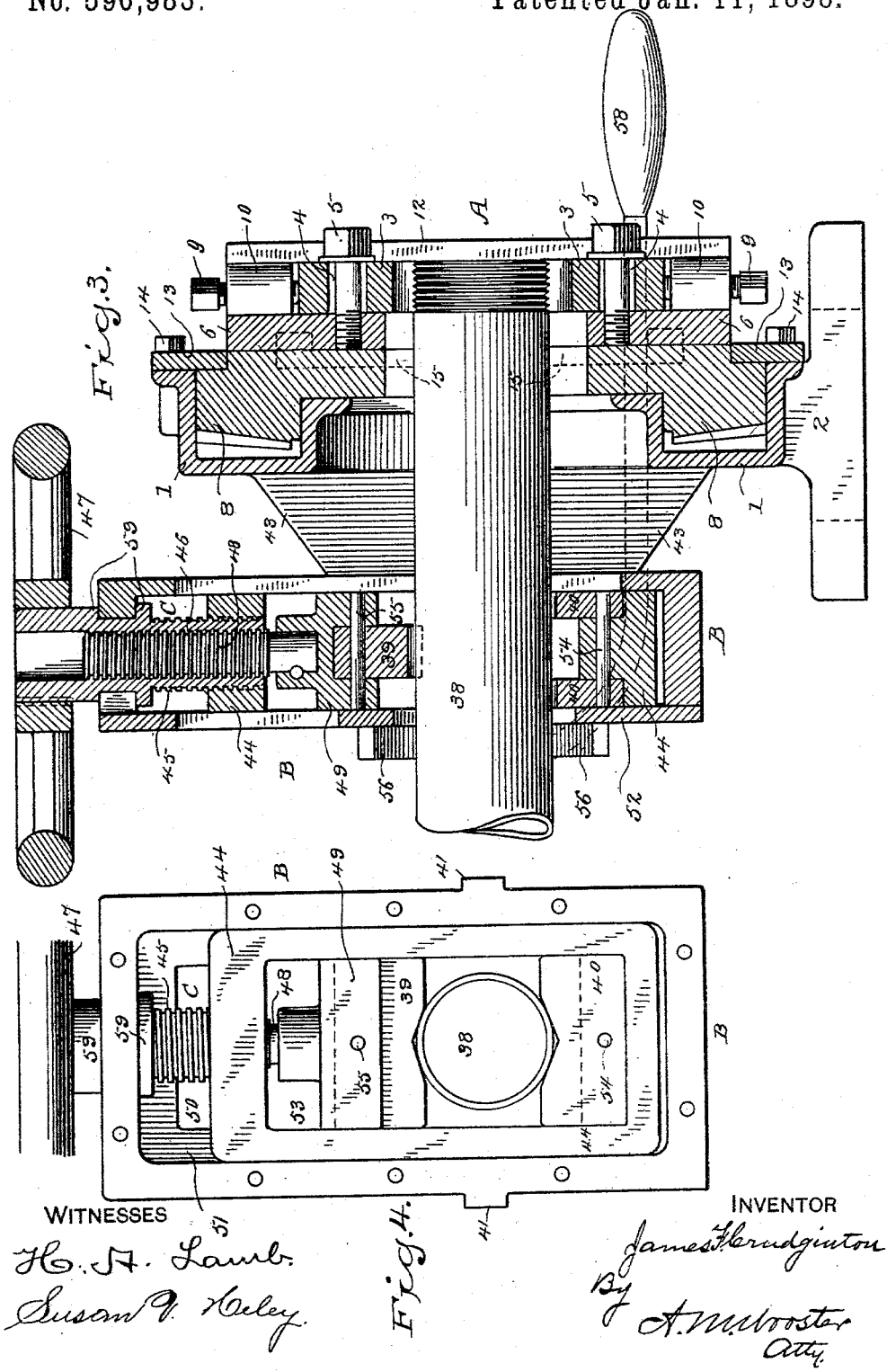

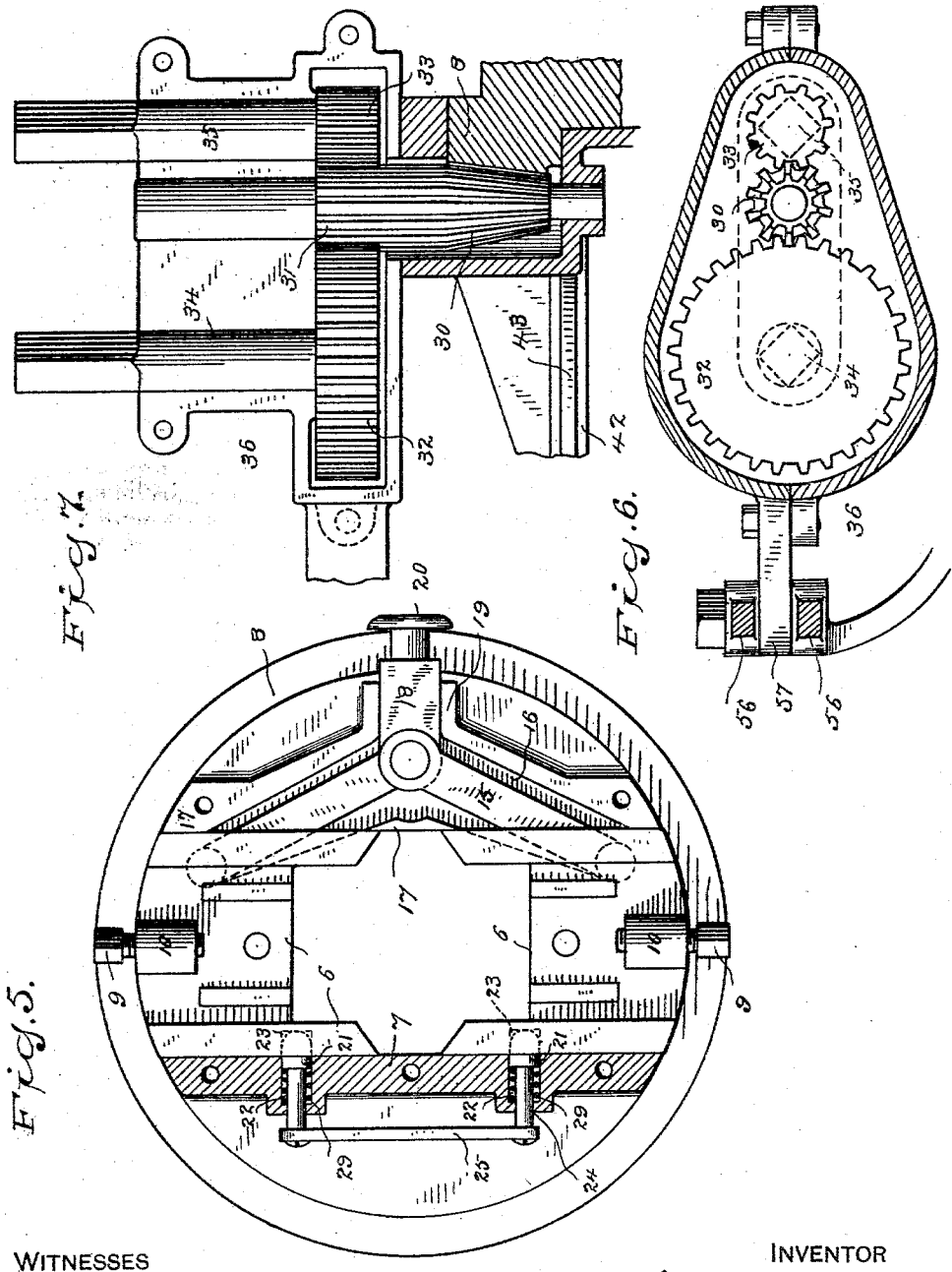

UNITED STATES PATENT OFFICE.

JAMES F. CRUDGINTON, OF BRIDGEPORT, CONNECTICUT, ASSIGNOR TO THE ARMSTRONG MANUFACTURING COMPANY, OF SAME PLACE.

HAND PIPE AND BOLT THREADING MACHINE.

SPECIFICATION forming part of Letters Patent No. 596,983, dated January 11, 1898.

Application filed May 17, 1897. Serial No. 636,847. (No model.)

*To all whom it may concern:*

Be it known that I, JAMES F. CRUDGINTON, a citizen of the United States, residing at Bridgeport, in the county of Fairfield and State of Connecticut, have invented certain new and useful Improvements in Hand Pipe and Bolt Threading Machines; and I do hereby declare the following to be a full, clear, and exact description of the invention, such as will enable others skilled in the art to which it appertains to make and use the same.

My invention has for its object to provide a hand machine for threading pipes and bolts which shall be simple and inexpensive to produce, shall have a quick speed for cutting the smaller threads upon either pipes or bolts and a slow speed for cutting the larger threads, and which shall be provided with a quick-acting and positive lock for the dies and with a quick-acting and absolutely accurate means for centering the pipe or bolt to be operated upon.

With these ends in view I have devised the novel hand threading-machine of which the following description, in connection with the accompanying drawings, is a specification, reference-characters being used to designate the several parts.

Figure 1 is a front elevation of the machine complete; Fig. 2, a rear elevation; Fig. 3, a section on the line *x x* in Fig. 2; Fig. 4, an elevation of the pipe-carrier and centering device detached; Fig. 5, an elevation of the die-head detached, the dies, face-plates, and ring being removed and one of the ways being in section; Fig. 6, a section on the line *y y* in Fig. 1; and Fig. 7 is a detail view, partly in plan and partly in horizontal section, of the driving mechanism, the cap-plate, as seen in Fig. 6, being removed.

1 denotes the casing, 2 and $2^a$ legs by which the machine may be attached to a table, and $2^b$ a leg on the back of the casing, which, in connection with the leg $2^a$, permits the machine to be attached to an upright, said legs $2^a$ and $2^b$ being provided with vertical flanges $c$, whereby the machine may be secured in position without horizontal support.

3 denotes the dies, in the present instance ordinary Armstrong stock-dies. These dies are provided with slots 4 and are held in place by bolts 5, which pass through these slots and engage die-carriers 6. The die-carriers are adapted to slide between ways 7 and 17, which are either cast integral with or rigidly secured to a bevel gear-wheel 8, which is adapted to rotate in the casing. This gear-wheel and the parts carried thereby comprise the die-head, which as a whole I designate by A. The dies are locked against outward movement on the carriers by means of bolts 9, carried by bosses 10 on the die-carriers. The die-carriers and dies are retained in the ways by face-plates 11 and 12, which engage, respectively, ways 7 and 17, and the gear-wheel and various parts carried thereby are retained in the casing by a ring 13, which is secured to the casing by bolts 14.

The die-carriers and dies may be moved into or out of operative position instantly and are rigidly locked in operative position by mechanism which I will now describe.

15 denotes links which are pivoted to the die-carriers (see Fig. 5 and dotted lines, Fig. 1) and which lie in a recess 16 in way 17. The other ends of these links are pivoted to a slide 18, which is adapted to move in a way 19 upon the back of the gear-wheel, in the present instance said way being cast integral with way 17 and with the gear-wheel. At the outer end of slide 18 is a handpiece 20 for convenience in operation.

21 denotes locking-bolts, which are held at their thrown position by springs 29, said springs and a portion of the heads of the locking-bolts lying normally in sockets 22 in way 7 and the outer ends of the heads of the bolts normally engaging sockets 23 in die-carriers 6. (See dotted lines, Fig. 5.) The shanks of these bolts pass through openings 24 in the back of way 7 and are connected by a cross-piece 25.

26 (see Fig. 1) denotes a lever fulcrumed on a stud 27, which extends outward from the back of way 7. The outer end of this lever comprises a handpiece 28 for convenience in operation, and the inner end of said lever engages the under side of cross-piece 25 at about its mid-length. When it is desired to release a pipe or bolt that has been threaded or to move the dies and die-carriers outward for any purpose, the operator by pressing downward upon the handpiece of lever 26 draws locking-bolts 21 out of sockets 23 in the die-carriers, thus releasing the die-carriers and enabling the operator to move the die-carriers, and with them the dies, outward by pressing inward upon handpiece 20 on slide 18. The instant the die-carriers have moved outward from their operative position the ends of locking-bolts 21 will rest against the edges of the die-carriers and will be retained out of the locking position. As soon as the pipe or bolt that has been threaded is removed and another one is in place, or when it is desired to move the dies into operative position, the operator by means of handpiece 20 draws slide 18 outward and moves the die-carriers and dies to the locking position, at which position they are instantly locked by the engagement of locking-bolts 21 with sockets 23 in the die-carriers, springs 29 acting to force the bolts to the thrown position the instant sockets 22 and 23 register with each other.

Bevel gear-wheel 8, and with it the dies and die-carriers, is driven by means of a bevel-pinion 30, which is formed integral with a pinion 31, said pinion 31 being in mesh with a relatively large gear-wheel 32 and a relatively small gear-wheel 33. (See Fig. 7.) These gear-wheels are carried, respectively, by shafts 34 and 35, journaled in a casing 36, which also incloses the gear-wheels. One part of this casing is ordinarily cast integral with or rigidly secured to casing 1. Both of these shafts are provided with squared ends, which are adapted to be engaged by a crank 37. In threading large pipes or bolts the crank would be placed upon the squared end of shaft 35, which produces a slow speed—as, for example, in threading one to two inch pipe. In threading one-eighth to one inch pipe the crank would be placed upon the squared end of shaft 34, which would produce the quick speed.

38 denotes a pipe that is being operated upon and which is centered by upper and lower jaws 39 and 40. In the present instance I have shown one upper and two lower jaws. These jaws are adapted to slide vertically in a sliding pipe-carrier, which as a whole I designate by B. The sides of the pipe-carrier are provided with ribs 41, which are adapted to slide in ways 42 on the inner sides of brackets 43, which extend backward from the casing.

The construction and operation of the centering-jaws will be clearly understood from Figs. 3 and 4.

44 denotes a slide which carries the lower centering-jaws 40 and is adapted to move vertically upon the carrier. The movement of this slide is controlled by an external thread 45 upon a screw C, this external thread engaging the slide, as clearly shown in Fig. 3, and the screw being held against longitudinal movement in any ordinary manner—for example, by enlargements 59, engaging the opposite sides of the wall of the carrier, as clearly shown in Fig. 3—and being provided with a hand-wheel 47 for convenience in operation. Screw C is also provided with an internal screw-thread 46, which is engaged by screw 48, rigidly secured to a slide 49, which carries upper gripping-jaw 39 and is adapted to move upon slide 44 and wholly independently thereof.

It will of course be apparent that the details of construction of the pipe-carrier and the slides are not of the essence of my invention. I have shown the pipe-carrier as provided with an opening 50 and with a recess 51 to receive slide 44, said recess being formed partly in the pipe-carrier itself and the third side of said recess being formed by a face-plate 52, which is provided with an opening, through which the pipe or bolt to be threaded is passed and is secured to the carrier. (See Figs. 3 and 4 in connection with Fig. 2.) Slide 44 is provided with a recess 53, in which slide 49 moves freely, the ends of this slide being shown as abutting against the side walls of the recess. The two lower gripping-jaws 40 are shown as secured to slide 44 by a pin or bolt 54, and upper jaw 39 as secured to slide 49 by a pin or bolt 55.

It will of course be apparent that the external and internal threads of screw C, which I have designated, respectively, by 45 and 46, are right and left threads, so that when slide 44, carrying the lower gripping-jaws, is raised by rotation of screw C the same movement by means of screw 48, which is rigidly secured to slide 49, will carry said slide 49 and the upper gripping-jaw downward, the movement of said gripping-jaws toward each other being uniform, so that any size of pipe or bolt within the range of the machine will be gripped and held firmly and centered with absolute accuracy by these gripping-jaws without the necessity of any change whatever in adjustment in changing from one size of pipe or bolt to another. It will be noted that power is applied to both gripping-jaws centrally, thereby insuring the firmest possible grip upon the pipe or bolt.

In threading a pipe or bolt the carrier and the pipe or bolt may be fed forward in any suitable manner. In the present instance I have shown a feeding-lever 56, which is bifurcated to straddle the pipe or bolt, as clearly shown in Fig. 2. This lever is fulcrumed on an ear 57, which extends outward from one of the parts of casing 36. The gripping-arm of the feeding-lever may be curved in any direction to suit the convenience of the operator. In the present instance I have shown the gripping-arm of this lever as curved downward under casing 36 and as provided with a handpiece 58 for convenience in operation.

The operation of the machine as a whole will, it is thought, be clearly understood from the description already given.

When it is desired to thread a pipe or bolt, centering-jaws 39 and 40 upon the pipe-carrier are opened far enough by means of hand-wheel 47 to permit the pipe or bolt to be passed between the jaws as far forward as required, depending, of course, upon the length of thread which it is desired to cut. Having placed the pipe or bolt between the centering-jaws, it is locked there and centered with absolute accuracy, no matter what may be its size, by turning hand-wheel 47 in the opposite direction until the jaws close upon the pipe or bolt. The dies are opened by withdrawing locking-bolts 21 by means of lever 26 and then throwing the die-carriers and dies to their retracted position by means of hand-piece 20 on slide 18 and links 15. As soon as the pipe-carrier has been moved forward, so as to place the pipe or bolt in position to be engaged by the dies, the dies are moved to their operative position again by means of slide 18 and the links. The instant the dies reach their operative position they are locked there by bolts 21, actuated by springs 29. In order to thread the pipe or bolt it is simply necessary to turn gear-wheel 8 by means of crank 37 and to feed the pipe or bolt by means of lever 56. If the pipe or bolt to be threaded is small—for example, less than one inch in diameter—the crank may be placed upon shaft 34, and will thereby produce the quick speed of the machine. Should the pipe or bolt be of relatively large size—for instance, greater than one inch in diameter—the crank may be placed upon shaft 35, and will thereby produce the slow speed of the machine.

Having thus described my invention, I claim—

1. The combination with the dies and sliding die-carriers, of slide 18, links pivoted to said slide and to the die-carriers by which the dies may be moved into and out of operative position and means for locking said parts in operative position.

2. The combination with the dies and sliding die-carriers having sockets 23, of slide 18, links pivoted to said slide and to the die-carriers by which the dies may be moved into or out of operative position and spring-actuated locking-bolts which are adapted to engage the sockets to lock the dies in operative position.

3. The combination with the dies and sliding die-carriers having sockets 23, of slide 18, links pivoted to said slide and to the die-carriers, for the purpose set forth, spring-actuated locking-bolts which are adapted to engage said sockets to lock the dies in operative position and suitable means for retracting the locking-bolts when it is desired to retract the die-carriers and dies.

4. The combination with the dies and sliding die-carriers having sockets 23, of slide 18, links pivoted to said slide and to the die-carriers for the purpose set forth, spring-actuated locking-bolts which are adapted to engage the sockets to lock the dies in operative position, cross-piece 25 connecting said locking-bolts and lever 26 which is adapted to engage the cross-piece to disengage the locking-bolts from the sockets.

5. The combination with gear-wheel 8 carrying ways 7 and 17, of die-carriers adapted to slide in said ways, means for moving said die-carriers into and out of operative position and means for automatically locking said die-carriers in operative position.

6. The combination with gear-wheel 8 carrying way 7, way 17 having recess 16 and way 19, of die-carriers adapted to slide in ways 7 and 17, slide 18 in way 19 and links lying in the recess and pivoted to said slide and to the die-carriers whereby the latter may be moved into and out of operative position.

7. In combination a die-head comprising a gear-wheel, sliding die-carriers, means for moving said die-carriers into and out of operative position and means for locking the die-carriers in operative position, all mounted on said gear-wheel, and means for imparting rotary movement to said die-head.

8. The combination with a die-head comprising bevel gear-wheel 8 and dies and carriers therefor mounted thereon, of bevel-pinion 30 engaging said gear-wheel, pinion 31 moving with the bevel-pinion and fast and slow speed gear-wheels each engaging pinion 31 and mounted on independent crank-shafts.

9. The combination with the die-head comprising a bevel gear-wheel, of a bevel-pinion engaging said gear-wheel, pinion 31 moving with said bevel-pinion and fast and slow speed gear-wheels mounted on independent crank-shafts, each engaging said pinion 31.

10. The combination with the die-head, a casing 1 in which it is mounted, change-speed mechanism for rotating the die-head and casing 36 in which it is inclosed, of brackets extending backward from casing 1 and provided with ways, a pipe-carrier and centering device adapted to slide in said ways and a bifurcated lever pivoted to casing 36 which is adapted to straddle the pipe or bolt being operated upon and to engage the pipe-carrier to move the latter and the centering device toward the die-head.

In testimony whereof I affix my signature in presence of two witnesses.

JAMES F. CRUDGINTON.

Witnesses:
A. M. WOOSTER,
S. V. HELEY.